United States Patent
Kim et al.

(10) Patent No.: US 7,488,549 B2
(45) Date of Patent: Feb. 10, 2009

(54) PROTON CONDUCTING POLYMER, POLYMER MEMBRANE COMPRISING THE SAME, METHOD OF MANUFACTURING THE POLYMER MEMBRANE, AND FUEL CELL USING THE POLYMER MEMBRANE

(75) Inventors: Keon Kim, Seongbuk-gu (KR); Heung Chan Lee, Seongbuk-gu (KR); Hyun Sil Hong, Seongbuk-gu (KR); You Mee Kim, Seongbuk-gu (KR)

(73) Assignee: Korea Chungang Educational Foundation, Seoul (KR)

( * ) Notice: Subject to any disclaimer, the term of this patent is extended or adjusted under 35 U.S.C. 154(b) by 746 days.

(21) Appl. No.: 10/835,386

(22) Filed: Apr. 30, 2004

(65) Prior Publication Data

US 2004/0219413 A1   Nov. 4, 2004

(30) Foreign Application Priority Data

May 3, 2003 (KR) ............... 10-2003-0028395
Apr. 16, 2004 (KR) ............... 10-2004-0026209

(51) Int. Cl.
*H01M 8/10* (2006.01)
(52) U.S. Cl. .......................... 429/33; 521/27
(58) Field of Classification Search ............... 525/390, 525/471, 538; 429/30, 33, 314, 317; 521/27
See application file for complete search history.

(56) References Cited

U.S. PATENT DOCUMENTS 5,155,175 A * 10/1992 Mercer et al. ............... 525/390

2003/0194593 A1 * 10/2003 Fan et al. ............... 429/33

FOREIGN PATENT DOCUMENTS

JP   06-111834   4/1994
JP   2002-226575   * 8/2002

* cited by examiner

*Primary Examiner*—Patrick Ryan
*Assistant Examiner*—Monique Wills
(74) *Attorney, Agent, or Firm*—Rothwell, Figg, Ernst & Manbeck

(57) ABSTRACT

A proton conducting polymer having a repeating unit given by formula (1) below is provided.

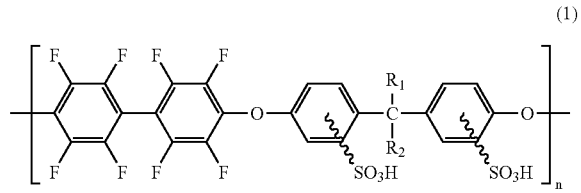

(1)

A proton conducting polymer membrane manufactured using the proton conducting polymer can be more easily manufactured than a conventional fluorine-based membrane and can be commercialized as an automobile fuel cell due to its low cost of production. Also, the proton conducting polymer membrane has high moisture content and does not cause the water flooding at high current density, thereby improving the efficiency of a cell. In addition, the proton conducting polymer membrane enables a fuel cell to stably operate at temperatures of 100° C. or higher, thereby preventing the poisoning of a catalyst and extending the lifetime of the fuel cell.

6 Claims, 6 Drawing Sheets

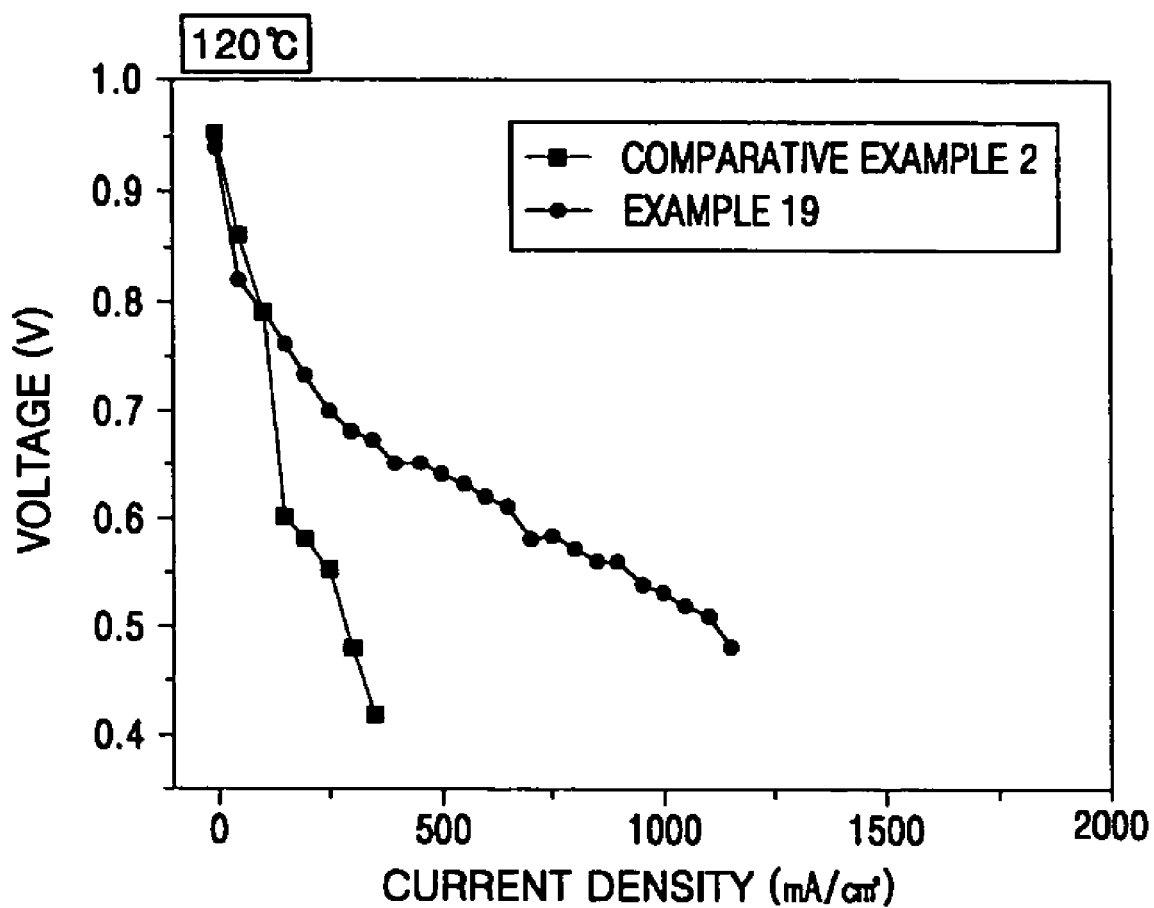

PROTON CONDUCTING POLYMER, POLYMER MEMBRANE COMPRISING THE SAME, METHOD OF MANUFACTURING THE POLYMER MEMBRANE, AND FUEL CELL USING THE POLYMER MEMBRANE

BACKGROUND OF THE INVENTION

This application claims the benefits of Korean Patent Application Nos. 2003-28395 and 2004-26209, filed on May 3, 2003 and Apr. 16, 2004, respectively, in the Korean Intellectual Property Office, the disclosure of which is incorporated herein in its entirety by reference.

1. Field of the Invention

The present invention relates to a proton conducting polymer, and more particularly, to a proton conducting polymer that does not cause water flooding, has good high-temperature properties and can be prepared at a low cost, a polymer membrane comprising the polymer, a method of manufacturing the polymer membrane, and a fuel cell manufactured using the polymer membrane.

2. Description of the Related Art

Recently, with growing concerns about the environment and the exhaustion of energy resources, and the commercialization of fuel cell automobiles, there is an urgent need for the development of reliable, high-performance fuel cells that are operable at an ambient temperature with high-energy efficiency and for the development of polymer membranes capable of increasing the efficiency of fuel cells.

Fuel cells are power generating systems that convert energy produced through the electrochemical reactions of fuel and oxidative gas directly into electric energy. Such fuel cells can be categorized into electrolyte fuel cells containing molten carbonate salt, which are operable at a high temperature of 500-700° C., electrolyte fuel cells containing phosphoric acid, which are operable around 200° C., and alkaline electrolyte fuel cells and polymer electrolyte fuel cells operable between room temperature and 100° C.

The polymer electrolyte fuel cells include proton exchange membrane fuel cells (PEMFCs) using hydrogen gas as a fuel source and direct methanol fuel cells (DMFCs) which generate power using liquid methanol directly applied to the anode as a fuel source. The polymer electrolyte fuel cells, which are emerging as a next generation clean energy source alternative to fossil fuels, have high power density and high-energy conversion efficiency. In addition, the polymer electrolyte fuel cells work at an ambient temperature and are easy to hermetically seal and miniaturize, so they can be extensively applied to the fields of zero emission vehicles, power generating systems for houses use, mobile telecommunications equipment, medical equipment, military equipment, space equipment, and the like.

The basic structure of a PEMFC as a power generator producing a direct current through the electrochemical reaction of hydrogen and oxygen is shown in FIG. 1.

Referring to FIG. 1, a PEMFC includes a proton-exchange membrane 11 interposed between an anode and a cathode.

The proton-exchange membrane 11 is composed of a solid polymer electrolyte with a thickness of 50-200 µm. The anode and cathode, respectively, include anode and cathode backing layers 14 and 15 for supplying reaction gases, and catalyst layers 12 and 13, in which oxidation/reduction of reaction gases occur, forming gas diffusion electrodes (hereinafter, the anode and cathode will be referred to as "gas diffusion electrodes"). In FIG. 1, a carbon sheet 16 has gas injection holes and acts as a current collector.

As hydrogen, a reactant gas, is supplied to the PEMFC, hydrogen molecules decompose into protons and electrons through an oxidation reaction in the anode. These protons reach the cathode via the proton-exchange membrane 11. Meanwhile, in the cathode, oxygen molecules take the electrons from the anode and are reduced to oxygen ions. These oxygen ions react with the protons from the anode to produce water.

As shown in FIG. 1, in the gas diffusion electrodes of the PEMFC, the catalyst layers 12 and 13 are formed on the anode and cathode backing layers 14 and 15, respectively. The anode and cathode backing layers 14 and 15 are composed of carbon cloth or carbon paper. The surfaces of the anode and cathode backing layers 14 and 15 are treated so that reaction gases and water can easily permeate into the proton-exchange membrane 11 before and after reaction. Hydrogen in the PEMFC is obtained by modifying natural gas or methanol. In the modification, carbon monoxide, which poisons a Pt catalyst, is generated and the performance of the fuel cell is considerably lowered. To increase a poisoning resistance to carbon monoxide, it is necessary that cell reaction only occurs at temperature of at least 100° C.

A proton conducting polymer membranes are used as a proton exchange membrane interposed between the anode and the cathode of the PEMFC. Polymers used for proton-conduction polymer membranes require high ionic conductivity, electrochemical stability, acceptable mechanical properties, thermal stability at working temperatures, the possibility of being processed into low-resistant thin films, small degree of swelling when soaking up liquid, etc. Fluorine-based membranes having fluorinated alkylene in their backbone and sulfonic acid groups at the terminals of fluorinated vinylether side chains, such as Nafion by Dupont, are currently available as proton conducting membranes. However, such fluorine-based membranes are unsuitable for automobile fuel cells due to their high price caused by a complicated substitution process with fluorine. Also, due to low moisture content, moisture in the fluorine-based membranes is vaporized when driving the fuel cells at a temperature of 100° C. or higher in order to prevent a catalyst from poisoning. As a result, the ionic conductivity is sharply decreased and driving of the fuel cell stops. Also, when driving the fuel cells at 100° C. or less, water flooding in the cathode occurs at a high current density. Accordingly, the effective area of the electrode reduces and the efficiency of the fuel cell deteriorates.

SUMMARY OF THE INVENTION

The present invention provides a proton conducting polymer capable of being prepared at a low cost due to easy sulfonation and workable at higher temperature due to high moisture content, thereby preventing a catalyst from poisoning.

The present invention also provides a proton conducting polymer membrane comprising the proton conducting polymer.

The present invention also provides a method of manufacturing the proton conducting polymer membrane.

The present invention also provides a fuel cell comprising the proton conducting polymer membrane.

According to an aspect of the present invention, there is provided a proton conducting polymer having a repeating unit given by formula (1) below:

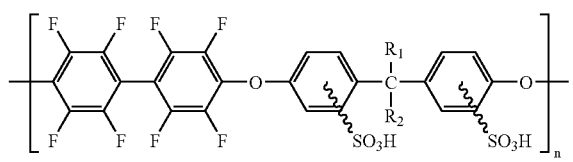

(1)

in which, each of $R_1$ and $R_2$ is methyl or trifluoromethyl; n is an integer from 100 to 100,000.

According to another aspect of the present invention, there is provided a proton conducting polymer membrane manufactured using the polymer having the repeating unit given by formula (1) above.

According to another aspect of the present invention, there is provided a method of manufacturing a proton conducting polymer membrane, the method including: dissolving decafluorobiphenyl and diphenol derivative in an organic solvent, adding potassium carbonate ($K_2CO_3$) to the solution, and stirring and heating the solution; cooling the solution and pouring the solution into an aqueous acetic acid solution to precipitate a polymer; dissolving the polymer in an aprotic organic solvent and adding a strong acid group donor into the solution to sulfonate; and adding 1-10% by weight of $SiO_2$ solution to a solution of the polymer dissolved in acetone, uniformly dispersing, and evaporating the solvent to form a membrane.

According to another aspect of the present invention, there is provided a fuel cell manufactured using the proton conducting polymer membrane.

BRIEF DESCRIPTION OF THE DRAWINGS

The above and other features and advantages of the present invention will become more apparent by describing in detail exemplary embodiments thereof with reference to the attached drawings in which:

FIG. 9 is a current density-voltage curve obtained when operating fuel cells manufactured in Example 19 and Comparative Example 2, respectively, at 120° C.

DETAILED DESCRIPTION OF THE INVENTION

Figure 1:
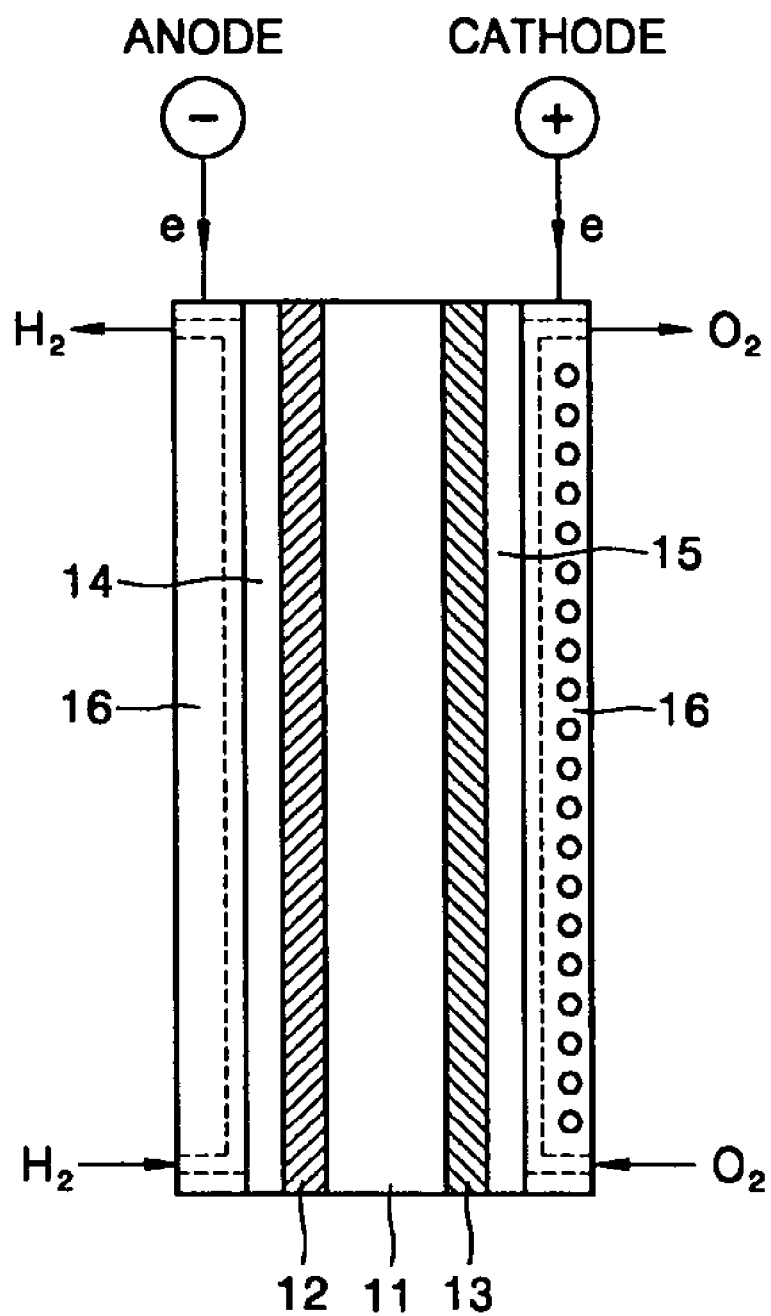
FIG. 1 shows a structure of a general proton exchange membrane fuel cell.

Hereinafter, the present invention will be described in more detail.

A base polymer used in a proton conducting polymer membrane according to an embodiment of the present invention is a polymer having a sulfonic acid group attached to a chain of poly(fluorinated aromatic ether) (PFAE) polymers prepared by a nucleophilic substitution of an aryl halide and a diphenol derivative. In the base polymer, a backbone of the polymer has thermal and chemical stability and maintains the mechanical strength. The sulfonic acid group transfers protons. In other words, the protons are transferred by the sulfonic acid group and have increased conductivity due to water. The n value of the repeating unit of the base polymer is from 100 to 10,000 and a number average molecular weight of the base polymer is from 5,000 to 1,000,000. If the number average molecular weight of the base polymer is less than 5,000, the mechanical property of the polymer is poor. If the number average molecular weight of the base polymer is greater than 1,000,000, it is difficult to dissolve the polymer in a solvent, which makes casting of a polymer membrane difficult.

Meanwhile, in the specification, an "equivalent weight" referring to a degree of sulfonation in the polymer is an average molecular weight of the polymer substituted with an equivalent of a sulfonic acid group. Thus, as this value decreases, more sulfonation occurs. The equivalent weight is calculated by dividing dry weight of the polymer by a concentration of the sulfonic acid group (g/eq). The concentration of the sulfonic acid group is obtained by immersing the polymer in a 0.1 N solution of sodium hydroxide for 12 hours, and then titrating the solution with 0.1 N hydrochloric acid using phenolphthalein as an indicator. The equivalent weight of the polymer is 250 to 2,500, and can be 400-1,200. If the equivalent weight of the polymer is less than 250, it is difficult to form a polymer membrane. If the equivalent weight of the polymer is greater than 2,500, a sufficient ionic conductivity is not ensured.

The proton conducting polymer membrane according to an embodiment of the present invention manufactured by casting the proton conducting polymer can be manufactured at a low cost and mass-produced since it is easy to sulfonate the base polymer. Also, the mechanical properties and the ionic conductivity can be optimally adjusted by optimising the degree of sulfonation. In addition, since the mechanical properties of the base polymer constituting the polymer membrane are easily adjusted by blending the base polymer with other polymers or by adding other organic or inorganic additives, the polymer membrane can be widely applied. Examples of the polymer capable of blending with the base polymer according to embodiments of the present invention include polyurethane, polyetherimide, polyetherketone, polyether-etherketone, polyurea, polyprophylene, polystyrene, polysulfone, polyethersulfone, polyether-ethersulfone, polyphenylenesulfone, polyaramide, polybenzimidazole, poly(bisbenzoxazole-1,4-phenylene), poly(bisbenzo(bisthiazole)-1,4-phenylene), polyphenyleneoxide, polyphenylenesulfide, poly p-phenylene, polytrifluorostylene sulfonic acid, polyvinylphosphonic acid and polystyrenesulfonic acid.

In the proton conducting polymer membrane according to an embodiment of the present invention, $SiO_2$ may be homogeneously dispersed in the base polymer with a concentration of 1-10% by weight based on the total weight of the composition. SiO$_2$ is hydrophilic inorganic matter and has good compatibility with an organic polymer and reactivity with a hydrophilic channel in the base polymer, thereby increasing the content of moisture. More specifically, SiO$_2$ binds to a hydrophilic portion of the base polymer to form SiOH which forms a strong hydrogen bond with water, resulting in maintaining the content of moisture even at a high temperature of 100° C. or higher. Thus, poisoning of an electrode catalyst in the fuel cell can be decreased. If the content of SiO$_2$ is less than 1% by weight, the addition effect is insufficient. If the content of SiO$_2$ is higher than 10% by weight, the brittleness of the polymer membrane deteriorates.

A method of preparing the proton conducting polymer according to an embodiment of the present invention will now be described in detail.

First, decafluorobiphenyl and a diphenol derivative are polymerised by addition-elimination to obtain poly(fluorinated aromatic ether) as illustrated by reaction scheme (1) below:

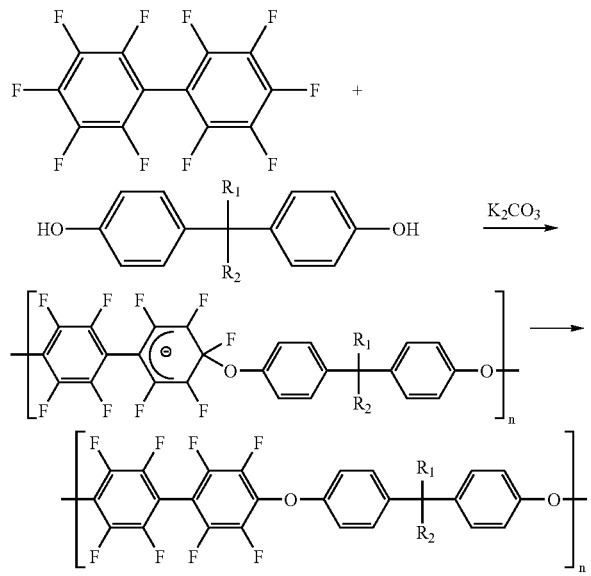

The diphenol derivative is 4,4-(hexafluoroisoprophylidene)diphenol or 4,4-isoprophylidene diphenol. The potassium carbonate is used in an excessive amount and acts as a base. A benzene ring is first activated by a fluorine atom of the decafluoro biphenyl, an addition of the oxygen atom occurs, and then an elimination of the fluorine atom occurs.

Next, a strong acid group donor is added to the matrix polymer to obtain a sulfonated polymer as illustrated by reaction scheme (2) below:

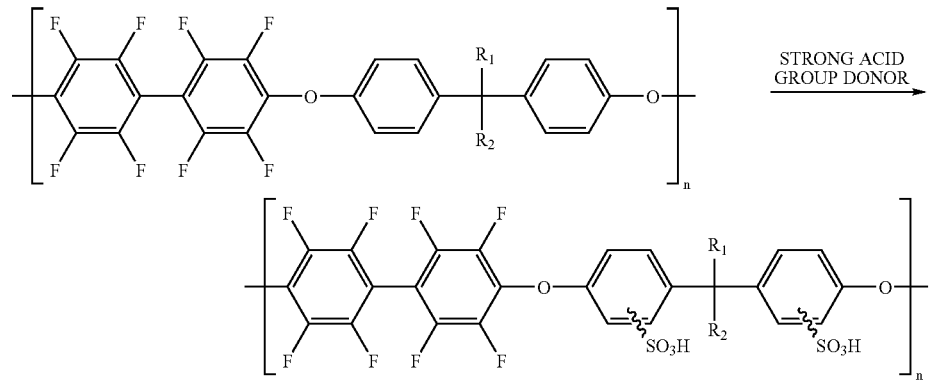

Since the poly(fluorinated aromatic ether) is hydrophobic, chloroform or 1,1,2,2-tetrachloroethane, which is an aprotic solvent, is used as a solvent thereof. The strong acid group donor binds to the aromatic compound in the backbone of the polymer to donate an acid group. As a result, ionic conductivity is increased by the final polymer membrane. Examples of the strong acid group donor include chlorosulfonic acid, acetyl sulfonate, and fuming H$_2$SO$_4$. The sulfonation occurs by substituting a hydrogen atom with SO$_3$H in the activated reaction site of the aromatic compound through a nucleophilic substitution reaction. The nucleophilic substitution reaction site is affected by the kind of substituents bound to a phenyl ring. If the substituents are phenyl ether and a methyl group, which are electron donating groups, ortho- and para-positions of the phenyl ring are activated. Meanwhile, if the substituent is trifluoromethyl, which is an electron withdrawing group, a meta position of the phenyl ring is activated. Therefore, the sulfonation is more easily accomplished when using 4,4-isoprophylidene diphenol than 4,4-(hexafluoroisoprophylidene)diphenol as diphenol derivative.

In the case of Nafion, the sulfonating process is very complicated, and thus, the cost of production is high. Meanwhile, in the case of the polymer membrane according to an embodiment of the present invention, the sulfonating process is very simple, and thus, the cost of production is low and mass production is possible.

A degree of sulfonation during sulfonating is adjusted by changing the reaction time, the concentration of the strong acid group donor, the concentration of the reaction polymer, the reaction temperature or the solvent. In embodiments of the present invention, the degree of sulfonation is adjusted by changing the reaction time and the concentration of the strong acid group donor. As the degree of sulfonation is increased, the content of moisture in the polymer is increased. Accordingly, ion exchange capacity (IEC) also increases. However, when the polymer contains an excessive amount of water, breakdown of the polymer chain may occur. The IEC is inversely proportional to the equivalent weight as previously defined.

The reaction time when sulfonating may be 1-4 hours. If the reaction time is less than 1 hour, the sulfonation is not sufficient, resulting in insufficient IEC. If the reaction time is longer than 4 hours, the efficiency of processing decreases. The molar ratio of the polymer to fuming sulfuric acid may be from 1:10 to 1:30. When the molar ratio is less than 1:10, the degree of sulfonation is not sufficient, resulting in low IEC. If the molar ratio is higher than 1:30, physical properties of the polymer may be deteriorated.

The proton conducting polymer membrane according to embodiments of the present invention may be prepared by dissolving the polymer obtained as above or a polymer blend containing the polymer in a solvent, mixing the solution with an $SiO_2$ solution, and then forming a film having a desired thickness by using a solution casting method or a hot pressing method. The thickness of the polymer membrane may be in the range of 5 to 200 μm.

A fuel cell according to an embodiment of the present invention may be manufactured in the conventional manner by interposing the above-described proton conducting polymer membrane between a cathode and an anode to form a single cell.

The present invention will now be described in greater detail with reference to the following examples. The following examples are for illustrative purposes and are not intended to limit the scope of the invention.

EXAMPLE 1

Preparation of a Poly(Fluorinated Aromatic Ether) Having a Sulfonic Acid Group

A three-neck round bottom flask equipped with a nitrogen inlet was charged with 17.05 g of decafluorobiphenyl, 17.16 g of 4,4-(hexafluoroisoprophylidene)diphenole, and 350 ml of anhydrous N,N-dimethylacetamid (produced by Aldrich) and stirred and a transparent solution was obtained. Then, excess of potassium carbonate (produced by Junsei) was added to the solution and the mixture was heated to 120° C. and reacted for 2 hours. After the reaction was complete, the resulting solution was poured into a 1% aqueous acetic acid solution to obtain a white precipitate. The precipitate was washed with distilled water several times and dried in a vacuum oven for 24 hours to obtain a white polymer powder. 2.0 g of the polymer powder was charged into a flask containing 198 ml of chloroform and the solution was stirred to obtain a transparent solution. 98% fuming sulphuric acid was slowly added to this solution in the molar ratio of 1:10 (polymer:fuming sulphuric acid) while stirring and the mixture was reacted for 2 hours. The solution was slowly added to excess distilled water to obtain a white precipitate. Then, chloroform was evaporated and the precipitate was washed with distilled water several times until washing water with pH 7 was attained and the precipitate was dried in the vacuum oven for 24 hours to obtain a sulfonated poly(fluorinated aromatic ether)(SDF-F). The following NMR data is data for the poly(fluorinated aromatic ether) before the sulfonation. Since peaks are very complicated after the sulfonation and it is difficult to assign peaks, only the data obtained before the sulfonation is provided. After the sulfonation, peaks shifted downfield compared to peaks before the sulfonation.

Weight average molecular weight: $4.33 \times 10^5$

Number average molecular weight: $1.83 \times 10^4$ $^1$H-NMR ($CD_3COCD_3$): δ 7.337~7.367 (d, 4H, Ar—H), 7.483-7.510 (d, 4H, Ar—H)

$^{19}$F-NMR ($CD_3COCD_3$): δ −150.618~−150.569, −135.157~−135.080, −60.30

EXAMPLE 2

Preparation of a Poly(Fluorinated Aromatic Ether) Having a Sulfonic Acid Group

A sulfonated poly(fluorinated aromatic ether)(SDF-F) was prepared in the same manner as in Example 1, except that the molar ratio of the polymer to the fuming sulphuric acid was 1:20.

EXAMPLE 3

Preparation of a Poly(Fluorinated Aromatic Ether) Having a Sulfonic Acid Group

A sulfonated poly(fluorinated aromatic ether)(SDF-F) was prepared in the same manner as in Example 1, except that the molar ratio of the polymer to the fuming sulphuric acid was 1:30.

EXAMPLE 4

Preparation of a Poly(Fluorinated Aromatic Ether) Having a Sulfonic Acid Group

A sulfonated poly(fluorinated aromatic ether)(SDF-F) was prepared in the same manner as in Example 2, except that the polymer and the fuming sulphuric acid were reacted for 1 hour.

EXAMPLE 5

Preparation of a Poly(Fluorinated Aromatic Ether) Having a Sulfonic Acid Group

A sulfonated poly(fluorinated aromatic ether)(SDF-F) was prepared in the same manner as in Example 2, except that the polymer and the fuming sulphuric acid were reacted for 1 hour and 30 minutes.

EXAMPLE 6

Preparation of a Poly(Fluorinated Aromatic Ether) Having a Sulfonic Acid Group

A sulfonated poly(fluorinated aromatic ether)(SDF-F) was prepared in the same manner as in Example 2, except that the polymer and the fuming sulphuric acid were reacted for 3 hours.

EXAMPLE 7

Preparation of a Poly(Fluorinated Aromatic Ether) Having a Sulfonic Acid Group

A sulfonated poly(fluorinated aromatic ether)(SDF-F) was prepared in the same manner as in Example 2, except that the polymer and the fuming sulphuric acid were reacted for 4 hours.

EXAMPLE 8

Preparation of a Poly(Fluorinated Aromatic Ether) Having a Sulfonic Acid Group

A sulfonated poly(fluorinated aromatic ether)(SDF-H) was prepared in the same manner as in Example 2, except that 2.0 g of 4,4-isoprophylidene diphenol was used instead of 4,4-(hexafluoroisoprophylidene)diphenol. NMR data for the poly(fluorinated aromatic ether) before the sulfonation is as follows.

Weight average molecular weight: $1.25 \times 10^5$
Number average molecular weight: $1.82 \times 10^4$
$^1$H-NMR (CDCl$_2$CDCl$_2$): δ 1.572 (s, 6H, CH$_3$), 6.850~6.878 (d, 4H, Ar—H), 7.103~7.131 (d, 4H, Ar—H)
$^{19}$F-NMR (CDCl$_2$CDCl$_2$): δ −150.988~−150.939, −135.634~−135.547

EXAMPLE 9

Manufacturing of a Proton Conducting Polymer Membrane 1.0 g of the white powder obtained in Example 2 was dissolved in acetone and a transparent solution was obtained. The solution was cast to film and the film was dried in a vacuum oven at 70° C. to manufacture a proton conducting polymer membrane.

EXAMPLES 10-16

Manufacturing of a Proton Conducting Polymer Membrane 2 ml of a tetraethyl orthosilicate (TEOS) solution, 4.7 ml of distilled water, and 100 ml of 0.1 M HCl were charged into an Erlenmeyer flask and the mixture was stirred for 3 hours at room temperature to prepare an SiO$_2$ solution. Meanwhile, 1 g of the sulfonated base polymers prepared in Examples 1 to 7, respectively, were dried in a vacuum oven for 24 hours and the dried polymers were dissolved in 20 g of acetone. The SiO$_2$ solution was added to the obtained polymer solution in an amount of 4% by mass and stirred to prepare a mixture solution. The obtained solution was dried in a Teflon dish at room temperature for 24 hours to provide a proton conducting polymer membrane including 4% by weight of SiO$_2$.

EXAMPLE 17

Manufacturing of a Proton Conducting Polymer Membrane

A proton conducting polymer membrane was manufactured in the same manner as in Example 10, except that 1 g of the sulfonated base polymer was dissolved in mixture of chloroform and ethanol (3:7).

COMPARATIVE EXAMPLE 1

Nafion 117 (produced by Dupont) was heated in a 30% by volume of H$_2$O$_2$ solution to remove organic matters from the surface of the Nafion 117. Then, the Nafion 117 was heated in 0.5 M sulphuric acid for 1 hour to substitute Na$^+$ with H$^+$ and washed with water to provide a proton conducting polymer membrane.

EXAMPLES 18 AND 19

Manufacturing of a Fuel Cell

The proton conducting polymer membranes obtained in Examples 9 and 11, respectively, were interposed between electrodes (produced by Bon Enterprises Inc.) composed of carbon doped with a 20% Pt catalyst. Then, the membrane and the electrodes were joined by hot pressing under a pressure of 15 atm, 100° C. to provide a membrane-electrode assembly (MEA).

EXPERIMENTAL EXAMPLE 1

Measurement of Water Uptake and Ionic Conductivity of a Proton Conducting Polymer Membrane The proton conducting polymer membranes obtained in Examples 9 through 17 and Comparative Example 1 were immersed in water, and then the variations in their weights were checked to determine water uptake. Meanwhile, the bulk resistance was derived through a Nyquist plot by an impedance analyser (IM6 produced by Zahner elektrik), and then, ionic conductivity was determined by the following equation. The results are shown in Table 1 below.

$$\sigma = \frac{4a}{\pi d^2 R_b}$$

where a is the thickness of the film;
d is the radius of the electrode;
σ is the ionic conductivity; and
$R_b$ is the bulk resistance.

TABLE 1

|  | Water uptake (%) | Ionic conductivity (Scm$^{-1}$) |
| --- | --- | --- |
| Example 9 | 89.16 | $1.05 \times 10^{-3}$ |
| Example 10 | 193.18 | $2.12 \times 10^{-3}$ |
| Example 11 | 201.33 | $3.94 \times 10^{-3}$ |
| Example 12 | 210.29 | $4.03 \times 10^{-3}$ |
| Example 13 | 30.08 | $1.22 \times 10^{-4}$ |
| Example 14 | 56.34 | $6.92 \times 10^{-4}$ |
| Example 15 | 94.23 | $1.13 \times 10^{-3}$ |
| Example 16 | 98.69 | $1.17 \times 10^{-3}$ |
| Example 17 | 834.68 | $1.33 \times 10^{-2}$ |
| Comparative Example 1 | 28.51 | $2.95 \times 10^{-2}$ |

As seen in Table 1, the proton conducting polymers according to embodiments of the present invention had slightly lower or similar ionic conductivities to the conventional fluorine-based proton conducting polymer, but had very good water uptake. Thus, water flooding does not occur even at high current density, thereby improving the efficiency and the power density of the fuel cell. In particular, the fuel cell is workable at higher temperature, and thus, the poisoning of a catalyst can be prevented and the lifetime of the fuel cell can be extended.

EXPERIMENTAL EXAMPLE 2

Observation by EPMA

Figure 2A:
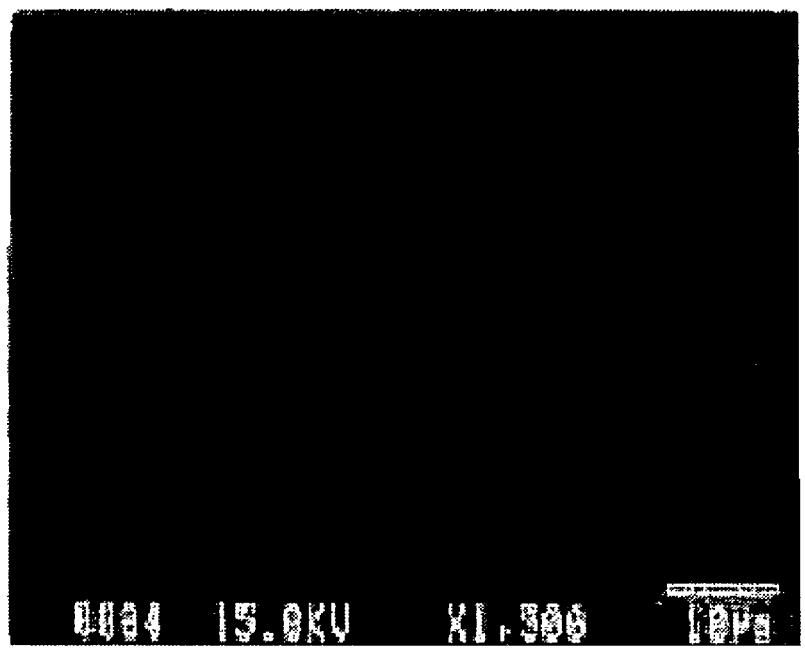
FIG. 2A shows a distribution of elements of a proton conducting polymer membrane manufactured in Example 9, observed by EPMA-Si mapping.
Figure 2B:
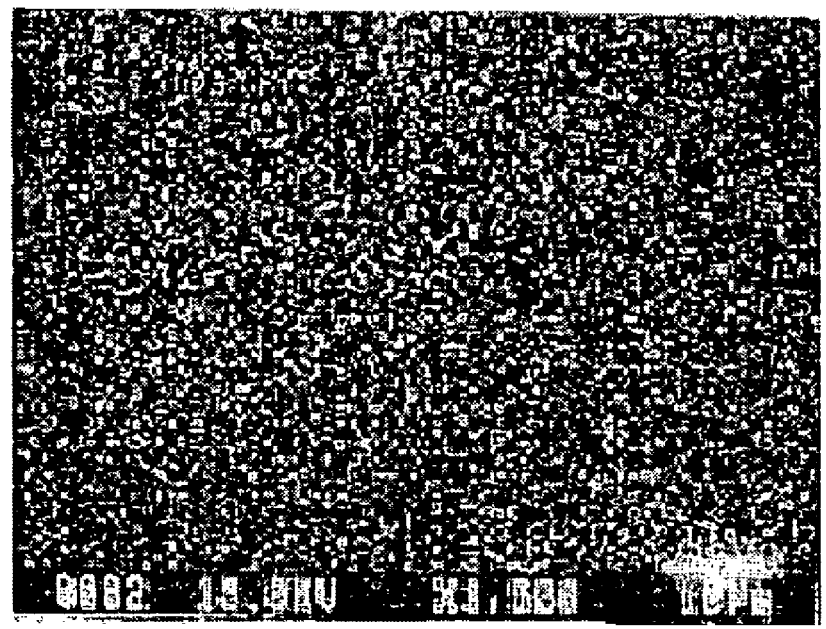
FIG. 2B shows a distribution of elements of a proton conducting polymer membrane manufactured in Example 11, observed by EPMA-Si mapping.

The distribution of elements in the proton conducting polymer membranes obtained in Examples 9 and 11 was observed with a Electron Probe Micro Analyser (EPMA) (JXA-8600 produced by JEOL)—Si mapping and the results are shown in FIG. 2. Referring to FIG. 2B, SiO$_2$ is uniformly distributed in the proton conducting polymer membrane having incorporated SiO$_2$ according to an embodiment of the present invention. Thus, The polymer according to an embodiment of the present invention has good compatibility with SiO$_2$.

EXPERIMENTAL EXAMPLE 3

Measurement of Thermal Stability of the Proton Conducting Polymer Membrane

Figure 3:
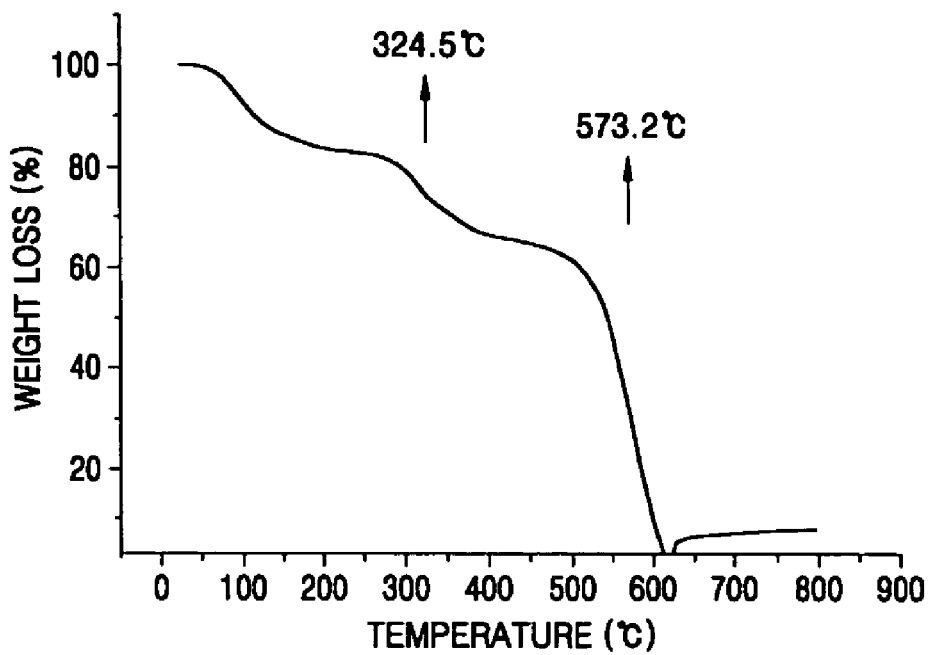
FIG. 3 is a graph illustrating weight loss with respect to temperature in a proton conducting polymer membrane manufactured in Example 9, measured using TGA.
Figure 4:
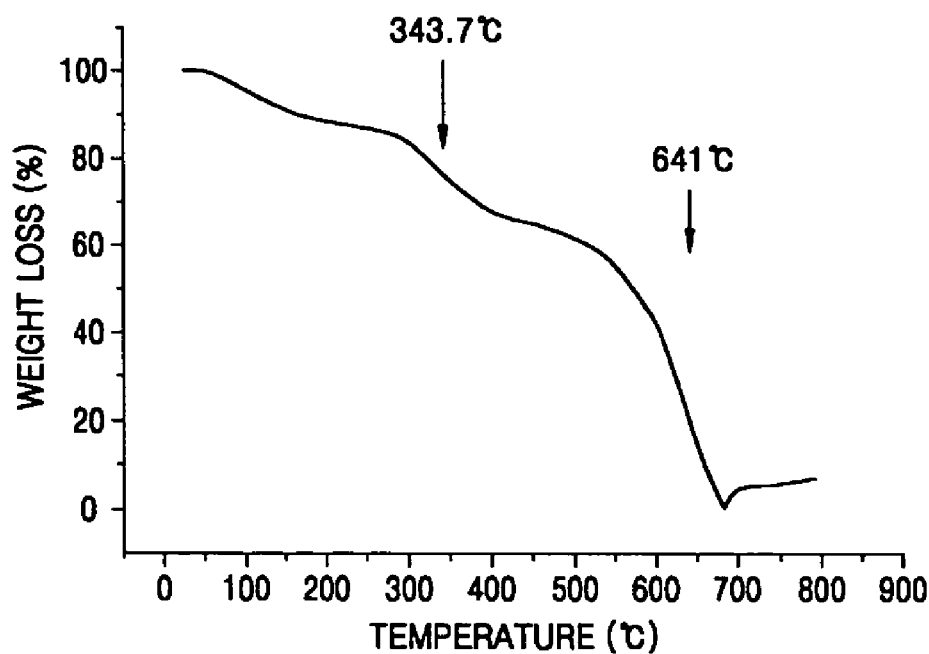
FIG. 4 is a graph illustrating weight loss with respect to temperature in a proton conducting polymer membrane manufactured in Example 11, measured using TGA.

The decomposition temperature of each of the proton conducting polymer membranes obtained in Examples 9 and 11 was checked by reduction of mass using Dupont TGA (thermogravimetric analyser) 2050 while raising the temperature. The results are shown in FIGS. 3 and 4. FIG. 3 was obtained from the proton conducting polymer membrane manufactured in Example 9. As seen from FIG. 3, —SO$_3$H group decomposed at 324.5° C. and the backbone of the polymer decomposed at 573.2° C., indicating that the proton conducting polymer membrane was stable at high temperature. Also, referring to FIG. 4 showing the result obtained from the proton conducting polymer membrane, —SO$_3$H group decomposed at 343.7° C. and the backbone of the polymer decomposed at 641° C., indicating improved thermal stability. It is assumed that the reason for this result is that in the case of incorporating $SiO_2$, the $SiO_2$ is bound to a hydrophilic portion of the proton conducting polymer to form SiOH, which forms a strong hydrogen bond with water, thereby improving the thermal stability.

EXPERIMENTAL EXAMPLE 4

Fuel Cell Test

A cell test was performed on each of the fuel cells manufactured in Examples 18 and 19, and Comparative Example 2. Oxygen gas was injected into a cathode and hydrogen gas was injected into an anode. The injection rate was 300 cc/min. At this time, the respective gases were passed through a humidifier to prevent a fuel from being dried. The temperatures of the cathode, anode, and cell were separately controlled using a thyristor power regulator (TPR). In order to measure the current and voltage, a counter current was applied to provide a constant resistance at open circuit voltage (O.C.V.). At each application, current density vs. power density, current density vs. voltage, and current vs. power density values were measured and the results are shown in FIGS. 5 through 9.

Figure 5:
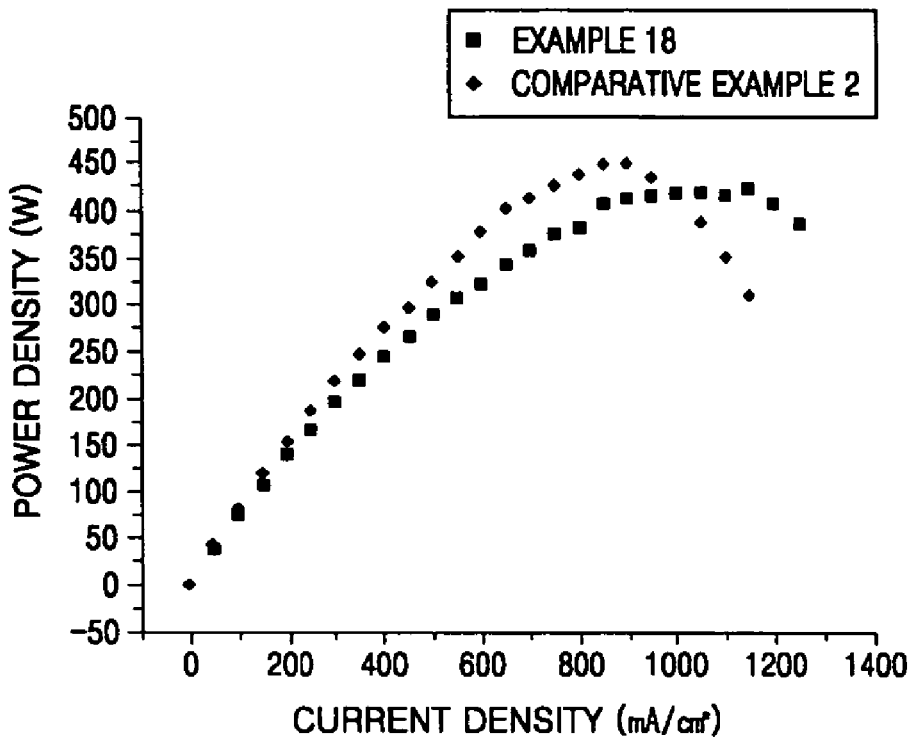
FIG. 5 is a current density-power density curve obtained when operating fuel cells manufactured in Example 18 and Comparative Example 2, respectively, at 80° C.

FIG. 5 shows current density-power density curves of the fuel cells obtained in Example 18 and Comparative Example 2, respectively, when operating at 80° C. The operating temperature of the cathode/cell/anode in both a lineheater and a humidifier was 85° C./80° C./90° C. and the pressure was 1 atm. Referring to FIG. 5, the fuel cell according to an embodiment of the present invention had a similar or slightly lower power density than the fuel cell of Comparative Example 2 at low current density, but had higher power density than the fuel cell of the Comparative Example at a current density of 1000 $mA/cm^2$ or higher, indicating good performance.

Figure 6:
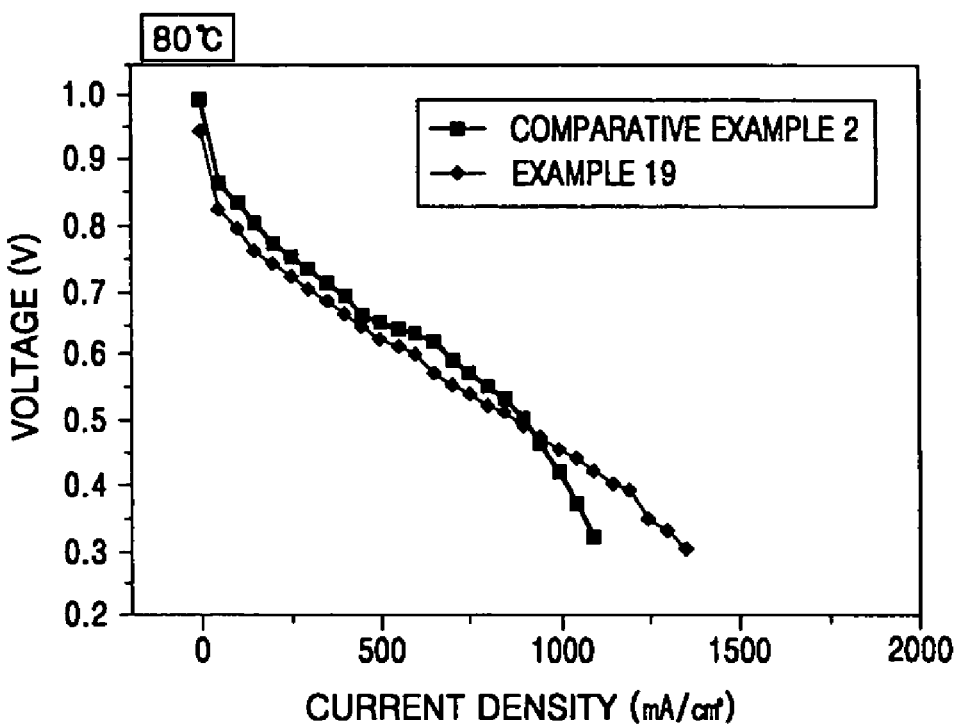
FIG. 6 is a current density-voltage curve obtained when operating fuel cells manufactured in Example 19 and Comparative Example 2, respectively, at 80° C.

FIG. 6 shows current density-voltage curves of the fuel cells obtained in Example 19 and Comparative Example 2, respectively, when operating at 80° C. The operating temperature of the cathode/cell/anode in both a lineheater and a humidifier was 85° C./80° C./90° C. and the pressure was 1 atm. Referring to FIG. 6, the fuel cell according to an embodiment of the present invention had a higher voltage than the fuel cell of Comparative Example 2 at a current density of 1000 $mA/cm^2$ or higher, indicating good performance. This is because the proton conducting polymer according to an embodiment of the present invention has high water uptake and does not cause water flooding.

Figure 7:
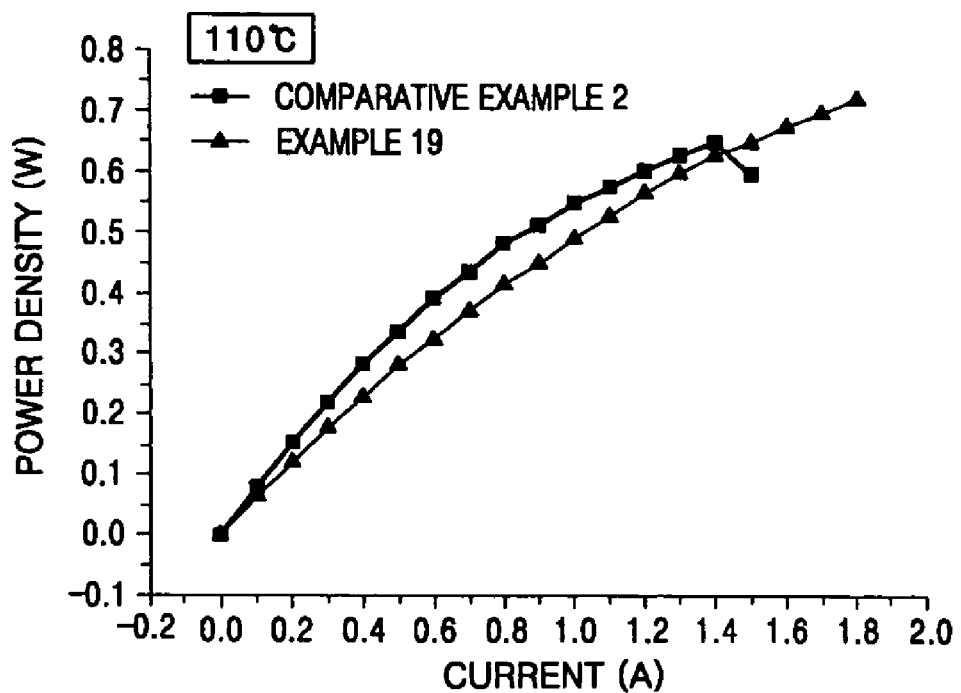
FIG. 7 is an initial current-power density curve obtained when operating fuel cells manufactured in Example 19 and Comparative Example 2, respectively, at 110° C.

FIG. 7 shows initial current-power density curves of the fuel cells obtained in Example 19 and Comparative Example 2, respectively, when operating at 110° C. The operating temperature of the cathode/cell/anode in both a lineheater and a humidifier was 108° C./110° C./108° C. and the pressure was 2 atm. In the case of the fuel cell obtained in Comparative Example 2, the data when the current was 1.5 A and higher is not shown since the voltage at this current was lower than 0.4 V but the measurement error was high, which made the measurement of the voltage difficult. Meanwhile, FIG. 8 shows current-power density curves after operating the fuel cells obtained in Example 19 and Comparative Example 2, respectively, at 110° C. for 16 hours.

Figure 8:
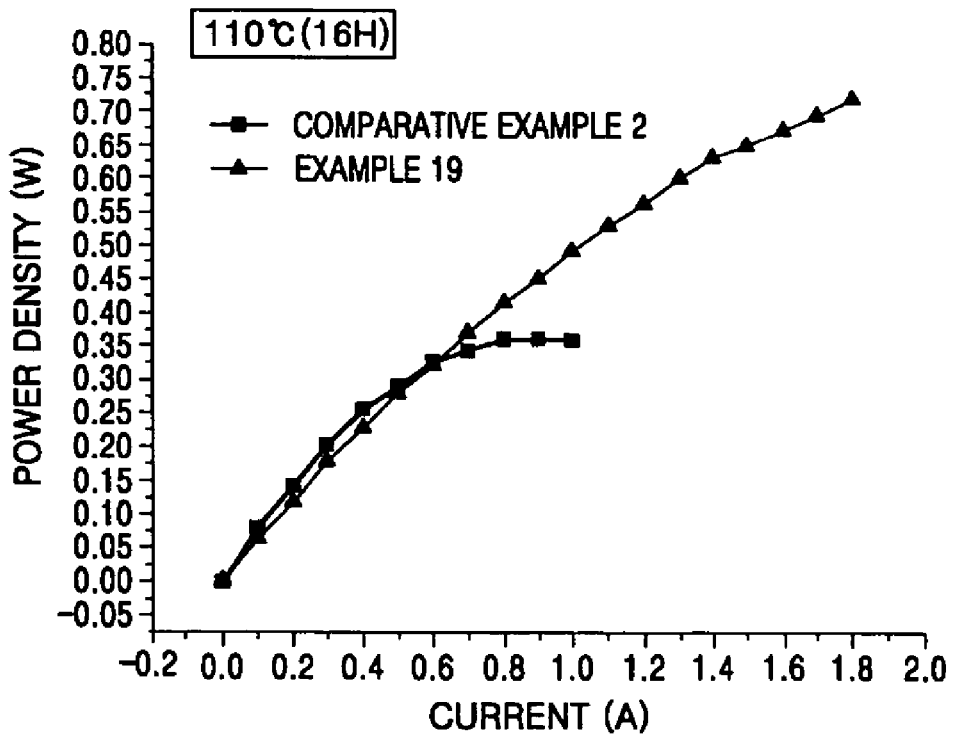
FIG. 8 is a current-power density curve obtained after operating fuel cells manufactured in Example 19 and Comparative Example 2, respectively, at 110° C. for 16 hours.

In FIG. 8, the data when the current was 1.0 A and higher in the fuel cell obtained in Comparative Example 2 is not shown, since the voltage at this current was very low, which made the measurement of the voltage difficult.

Referring to FIGS. 7 and 8, when operating the fuel cells at 110° C., the performance of the fuel cell according to an embodiment of the present invention was initially similar to that of the fuel cell obtained in Comparative Example 2, but after 16 hours, the power density and the performance of the fuel cell according to an embodiment of the present invention were superior to those of the fuel cell obtained in Comparative Example 2. In particular, as seen in FIG. 8, the power density of the fuel cell of Comparative Example 2 was less than 0.4 W and the power density of the fuel cell of Example 19 was at least 0.7 W. This is because the polymer membrane according to an embodiment of the present invention has high water uptake.

FIG. 9 shows a current density-voltage curve when operating the fuel cells obtained in Example 19 and Comparative Example 2, respectively, at 120° C. The operating temperature of cathode/cell/anode in both a lineheater and a humidifier was 113° C./120° C./113° C. and the pressure was 2.5 atm. Referring to FIG. 9, in the case of the fuel cell of Comparative Example 2, the voltage sharply decreased and the fuel cell did not operate at a current density of 500 $mA/cm^2$ or higher. Meanwhile, the fuel cell according to an embodiment of the present invention maintained good performance at a current density of 1000 $mA/cm^2$ and higher even at the operating temperature of 120° C. Thus, the fuel cell according to an embodiment of the present invention can have good performance at a high temperature and prevent a catalyst from poisoning, thereby extending the lifetime of the cell.

As described above, the proton conducting polymer membrane according to embodiments of the present invention can be more easily manufactured than the conventional fluorine-based membrane and can attain the commercialization of automobile fuel cells due to the low cost of production. Also, the proton conducting polymer membrane according to embodiments of the present invention has high water uptake and does not cause water flooding at high current density, thereby improving the efficiency of the cell. In addition, the proton conducting polymer membrane enables the fuel cell to stably operate at temperatures of 100° C. or higher, thereby preventing the poisoning of a catalyst and extending the lifetime of the fuel cell.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A proton conducting polymer for a fuel cell, having a repeating unit given by formula (1) below:

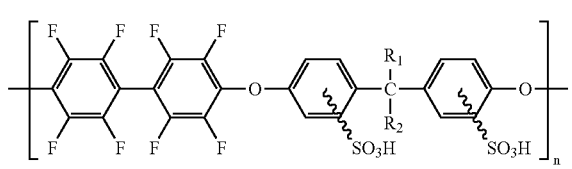

(1)

wherein, each of $R_1$ and $R_2$ is methyl or trifluoromethyl;
n is an integer from 100 to 100,000; and
the proton conducting polymer has an equivalent weight of 250-2,500.

2. The proton conducting polymer of claim 1, having a number average molecular weight of 5,000-1,000,000.

3. A proton conducting polymer membrane manufactured using the proton conducting polymer of claim 1.

4. The proton conducting polymer membrane of claim 3, comprising $SiO_2$ in an amount of 1-10% by weight based on the total weight of a mixture of the proton conducting polymer and the $SiO_2$.

5. The proton conducting polymer membrane of claim 3, wherein the proton conducting polymer has a number average molecular weight of 5,000-1,000,000.

6. The proton conducting polymer membrane of claim 3, wherein the proton conducting polymer has an equivalent weight of 250-2,500.

* * * * *